DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 16, 1969

869 O.G. 714

T869,013
PROCESS FOR PREPARING PHOTOGRAPHIC IMAGES WITH THALLIUM HALIDE EMULSIONS

Peter John Hillson, 66 Duke's Ave., Chiswick, London, England

Filed July 29, 1969, Ser. No. 845,875
Int. Cl. G03c *1/72*
U.S. Cl. 96—48
No Drawing. 5 Pages Specification

A process is described for photodevelopment of emulsions of thallous chlorobromide in a hydrophilic colloid, such as gelatin. An element comprising a coating of the emulsion is imagewise exposed to a high intensity flash of actinic radiation to form a latent image and is then overall exposed to low intensity radiation to develop a visible image in the previously exposed areas. The thallous chlorobromide coverage is typically about 0.005 mole per square foot.